United States Patent Office 3,174,845
Patented Mar. 23, 1965

3,174,845
PROCESS FOR PRODUCING SOIL-TREATING
MATERIAL
Roger Afton MacArthur, 724 Garfield Ave.,
Hinsdale, Ill.
No Drawing. Filed Jan. 16, 1961, Ser. No. 82,712
2 Claims. (Cl. 71—62)

This invention relates to a method for the production of a novel material suitable for use in the conditioning and treatment of soil. The invention relates more particularly to a method for incorporating into perlite, soil treating ingredients which can be provided in a liquid form.

In the use of certain soil-treating ingredients, and particularly fertilizers and like chemicals, major problems arise relating to the proper distribution of the ingredients and the rate of activity of the ingredients within the soil. In many instances, it is necessary to spread such materials periodically in order that excessive amounts of the treating compositions are not introduced at any one time, thus wasting the materials.

Carriers of inert materials have been proposed for such ingredients which carriers tend to dilute the amounts of ingredients and provide a more reasonable incidence of activity within the soil. Such carriers, however, have the treating compounds generally located at their surfaces, and when subjected to rainy conditions, the compounds will be washed away. It has not heretofore been possible to avoid this accelerated leaching of the active ingredients, and the lack of a suitable treating material remains a major problem in the agricultural industry.

It is therefore an object of this invention to provide a material suitable for use as a soil-treating compound which is susceptible of proper distribution within the soil and adaptable for an ideal rate of activity.

It is a further object of this invention to provide a material capable of achieving the above objects and also capable of maintaining its treating characteristics over a period of years.

It is a more specific object of this invention to provide a material consisting of perlite having incorporated therein amounts of soil-treating ingredients which are adapted to be released to the soil at a steady rate, but are generally not susceptible of accelerated release due to leaching.

These and other objects of this invention will appear hereinafter, and it will be understood that the specific examples which follow are submitted for purposes of illustration and not of limitation.

Expanded perlite, previously and hereinafter to be referred to simply as perlite, is characterized by a plurality of small voids or cells which are, however, normally impermeable under standard conditions to chemicals, fertilizers and the like. The use of perlite as a carrier for soil treating ingredients has previously involved the formation of the ingredients on the readily available surfaces of the perlite and there has been to this time no process evolved which permits absorption of such ingredients substantially throughout the perlite body. This is apparently due to the fact that the cells within the perlite are effectively sealed apart from each other, a condition which is evidenced by the fact that perlite will float indefinitely on water.

The process employed by applicant which makes possible the achieving of the above objects and which produces results contrary to what would be expected with perlite, consists broadly of a process wherein a chamber is provided and the soil-treating ingredient introduced therein in liquid form. Perlite is then added to the liquid and the pressure within the chamber is altered with respect to ambient conditions. This procedure, when practiced within the limitations hereinafter set forth enables the absorption of the treating ingredients substantially throughout the perlite materials.

Although no attempts have been made to specifically analyze the reasons for the results achieved in the practice of this invention, these results do indicate the existence of micropores through which the liquid soil-treating ingredients may be caused to pass when the hereinafter described process steps are effected.

The process of this invention is applicable for use with soil-treating agents which are adapted to be provided in a liquid state. The pressure conditions include either the formation of a vacuum within the chamber or the effecting of a high pressure therein. The pressure conditions are achieved in a manner which permits absorption of the treating ingredients, not only at the readily available surfaces, but also substantially completely throughout the perlite bodies.

It has been determined that the degree of vacuum or pressure are preferably controlled for practical reasons beyond certain minimum limits. A vacuum, which is equivalent to about 100 mm. of Hg or less, and pressures of about 2 atmospheres or more, have been found to be the ranges within which the advantageous results of this invention may be best achieved. The extent of the pressure or vacuum which is effected will control the degree of absorption of the treating ingredients within the perlite. For example, a pressure of 2 atmospheres will fill the pores within the perlite to about 50 percent capacity. A pressure of 5 atmospheres will fill the pores to about 80 percent of the capacity. With regard to the vacuum, it has been determined that a vacuum of about 76 mm. of mercury will fill about 90 percent of the volume of the voids.

The time necessary for filling the voids within the perlite is primarily dependent on the pressure, and the duration for a given pressure is quite short, ranging from several seconds to a few minutes.

Insofar as the character of the perlite is concerned, it may be generally stated that it is not critical; however, the size of the particles is a consideration from a handling standpoint and also will effect subsequent behavior in the soil. In this latter connection, it is not desirable that large amounts of the fertilizer or other treating ingredients be released during the cultivation of the soil. Therefore, it is not desirable that the particles containing the absorbed ingredients be broken up to a great degree during such cultivation, since this tends to release the ingredients. In order to avoid this large scale breaking up of the perlite, the particle size should not exceed ¼ inch, and advantageously, sizes from —10 to 100 mesh are employed. Generally, it may be stated that if the particles are too small, they do not contain sufficient voids to carry a practical amount of fertilizer. On the other hand, if the particles have sizes beyond the preferred ranges, they tend to release the fertilizer at undesirable times and generally too rapidly.

The density of the particles effects most significantly the rate of absorption of the treating ingredients, the more dense particles having fewer voids and consequently, less capacity for absorption. In the same respect, the amount of solids in relation to the liquid in the treating combinations will vary the rate of absorption.

The following non-limiting examples are presented as exemplary of this process, and in order to set forth the conditions under which the process can be conducted.

Into an enclosed 25-gallon container there was introduced 15 gallons of liquid fertilizer along with about 15 lbs. of granular perlite with the largest dimensions of any of the particles being about ¼ inch. A vacuum of about 50 mm. of Hg was effected in the chamber for about two minutes. After release of the vacuum, it was found that the perlite no longer floated, as is its normal habit, and it had absorbed liquid fertilizer sufficient to fill better than 90 percent of the voids within the perlite. Lime in an amount of about 10 percent by weight of the perlite was added to the solid material after removal from the container, this addition enhancing the free-flowing characteristics and thus the ease of spreading of the mixtures.

Testing of this perlite revealed that release of the fertilizer occurred quite slowly, there being substantial amounts of the fertilizer therein after being left in the soil for several months. Accelerated testing, effected by washing the treated perlite continuously, revealed that only small amounts of the fertilizer was leached out for a given period of time, and continued to be released for several days.

In order to effect absorption by means of the alternative method of this invention, a chamber of the same type as aforementioned was employed. However, as opposed to the vacuum, pressure was adapted to be built up within the chamber. The addition of materials of the same size and in same proportions as aforementioned for a like duration, but under about 5 atmospheres' pressure, provided perlite having 80% of the voids filled with fertilizer. Testing revealed that the perlite yielded to fertilizer in substantially the same ideal manner.

A comparison of the vacuum and pressure techniques reveals no substantial difference insofar as the product activity within the soil is concerned. Likewise, the physical character of the products insofar as the relationship of the perlite and ingredients is concerned is of the same nature whether vacuum or pressure has been employed in forming the product. It has been noted, however, that there is a tendency for the pressure-filled cells to release part of their contents as soon as the pressure is released. The vacuum-filled voids, on the other hand, do not exhibit such a tendency, and it is, therefore, recommended that the vacuum technique be used in preference to the pressure, wherever possible.

Several obvious advantages exist when considering the above noted results. It will be apparent that a single addition of the material of this invention will be adaptable for treating soil for several years without overburdening the soil with excessive fertilizer at any time, and while providing a continuous fertilizer. Although rains will be adaptable for leaching out amounts of treating ingredients sufficient to properly maintain soil, it will be apparent that there is no danger of severe rains completely depleting the perlite of its fertilizer. In the latter connection, it is to be noted that it is desirable to have the fertilizer released in given amounts when rain or dewy conditions prevail. This is one of the advantages of this invention, since the degree of release of fertilizer is readily controllable through the periods when it will do the most good. Likewise, the fertilizer containing perlite will lay substantially dormant within the soil for long periods when it is not needed and will still be available for treating the soil, when the need arises. It is further obvious that the perlite within the soil is available for its known uses as an aerator and soil loosener, which adds to the advantages obtainable with this invention.

It is understood that the use of liquid fertilizer is only one of the many applications of this invention, insofar as soil treating ingredients are concerned. It is contemplated, for example, that such materials as poisons employed for attacking undesirable elements in the soil can be readily incorporated within the perlite in accordance with this invention. With regard to the lime additions above noted, it is contemplated that further amounts of lime be added to the perlite and carried into the soil in this manner in the proportions ordinarily used.

When considering the above examples, it will be obvious that a semi-continuous operation involving periodic removal of the vacuum or pressure and recovery of the treated perlite is possible. It is also apparent that a continuous process may be employed; for example, a system providing suitable screw conveyors and pressure locks enabling continuous introduction of perlite and fertilizer and continuous removal of the combined substances.

It will be understood that various modifications may be made in the above disclosed soil-conditioning material and method, while providing the characteristics of this invention without departing from the spirit of the invention, particularly as defined in the following claims.

I claim:

1. A process for the preparation of soil-treating material comprising the steps of providing a vacuum chamber, introducing into said chamber expanded perlite and a soil-treating ingredient in liquid form, said perlite substantially comprising particles having largest dimensions between —10 mesh and ¼ inch in diameter, applying a vacuum within said chamber of at least about 100 millimeters of mercury whereby said perlite will absorb said ingredient into the body thereof to fill about 90 percent of the voids in said perlite, and removing the perlite with the absorbed ingredient from said chamber.

2. A process according to claim 1, including the step of mixing lime with perlite after absorption of the said ingredient, whereby the free-flowing characteristics of the treating material are improved.

References Cited in the file of this patent

UNITED STATES PATENTS

| | | |
|---|---|---|
| 2,027,766 | Davis et al. | Jan. 14, 1936 |
| 2,092,100 | Waynick | Sept. 7, 1937 |
| 2,498,480 | Bierlich | Feb. 21, 1950 |
| 2,779,670 | Burkett | Jan. 29, 1957 |
| 2,904,424 | Chapman et al. | Sept. 15, 1959 |
| 2,909,869 | Dresser | Oct. 27, 1959 |
| 3,006,753 | Harvey | Oct. 31, 1961 |
| 3,034,882 | Renwick | May 15, 1962 |